United States Patent
Lee et al.

(10) Patent No.: US 10,318,264 B2
(45) Date of Patent: Jun. 11, 2019

(54) METHOD AND SYSTEM FOR MATCHING FEATURES BETWEEN APPLICATION AND DEVICE

(71) Applicant: Samsung Electronics Co., Ltd., Gyeonggi-do (KR)

(72) Inventors: Heuijin Lee, Gyeonggi-do (KR); Namgeol Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 463 days.

(21) Appl. No.: 14/953,903

(22) Filed: Nov. 30, 2015

(65) Prior Publication Data

US 2016/0188695 A1 Jun. 30, 2016

(30) Foreign Application Priority Data

Dec. 31, 2014 (KR) .................. 10-2014-0195461

(51) Int. Cl.
*G06F 16/00* (2019.01)
*G06F 8/60* (2018.01)
*G06Q 10/06* (2012.01)

(52) U.S. Cl.
CPC ............ *G06F 8/60* (2013.01); *G06Q 10/0633* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,506,048 B1 * | 3/2009 | Motoyama | ............ | H04L 41/022 709/217 |
| 8,515,979 B2 * | 8/2013 | Mehta | ............... | G06F 17/30017 707/758 |
| 9,323,936 B2 * | 4/2016 | Quong | .................... | G06F 21/60 |
| 2005/0257006 A1 * | 11/2005 | Yoshida | ............. | G05B 23/0283 711/118 |
| 2007/0260991 A1 | 11/2007 | Schueler et al. | | |
| 2010/0041385 A1 * | 2/2010 | Kim | .................... | H04B 1/0003 455/419 |
| 2010/0205436 A1 * | 8/2010 | Pezeshki | ............... | H04W 8/245 713/168 |

(Continued)

OTHER PUBLICATIONS

Device Compatibility, http://developer.android.com/guide/practices/compatibility.html, pp. 1-3, Mar. 2018.

(Continued)

*Primary Examiner* — Etienne P Leroux
(74) *Attorney, Agent, or Firm* — Cha & Reiter, LLC.

(57) ABSTRACT

A method and system for matching features between applications and devices are provided. A feature matching system comprising: a communication unit configured to make communication with external devices; a controller configured to collect features via the communication unit, create device groups having common features between applications and electronic devices, determine a correlation between the features, and match the features between the applications and the electronic devices based at least in part on the device groups; and a database configured to store the collected features and the device groups.

18 Claims, 8 Drawing Sheets

(56) References Cited

U.S. PATENT DOCUMENTS

| | | | | | |
|---|---|---|---|---|---|
| 2012/0033810 | A1* | 2/2012 | Devadas | ............... | G06F 21/31 380/46 |
| 2012/0246530 | A1* | 9/2012 | Whetsel | ............ | G01R 31/3025 714/727 |
| 2012/0315607 | A1* | 12/2012 | Shin | ................. | G06F 3/0488 434/114 |
| 2014/0155090 | A1* | 6/2014 | Khorashadi | ............ | H04W 4/04 455/456.2 |
| 2014/0278723 | A1* | 9/2014 | Liu | ................. | G06Q 10/0633 705/7.27 |
| 2015/0061829 | A1* | 3/2015 | Williams | ............ | G07C 9/00111 340/5.61 |

OTHER PUBLICATIONS

Heuijin Lee et al., An Efficient Application-Device Matching Method for the Mobile Software Ecosystem, Department of Computer Science, Kaist, Daejeon, Republic of Korea, pp. 1-8; Dec. 2014.

* cited by examiner

FIG. 5

| Features / Device Name | Platform feature [1:n] | | | Manufacturer feature [1:n] | | | Regional feature [1:n] | | | Differentiated feature [1:n] | | |
|---|---|---|---|---|---|---|---|---|---|---|---|---|
| | PF1 | ... | PFn | MF1 | ... | MFm | RG1 | ... | RGi | DF1 | ... | DFj |
| Device X | ○ | ... | × | ○ | ... | × | ○ | ... | × | × | ... | × |
| Device Y | ○ | ... | ○ | × | ... | × | ○ | ... | × | ○ | ... | × |
| Device Z | ○ | ... | × | × | ... | × | × | ... | × | × | ... | × |

METHOD AND SYSTEM FOR MATCHING FEATURES BETWEEN APPLICATION AND DEVICE

CLAIM OF PRIORITY

This application claims the benefit under 35 U.S.C. § 119(a) of Korean patent application filed on Dec. 31, 2014 and assigned Serial No. 10-2014-0195461, the entire disclosure of which is hereby incorporated by reference, as if fully set forth herein, for all purposes.

BACKGROUND

Embodiments of the presented herein relate to method(s) and apparatus for matching features between applications and devices.

In open platforms such as Google's Android, Tizen, etc., matching features between applications and devices have not identified all electronic devices with various features produced by manufacturers. Performing feature matching between applications and devices, based on features of reference devices defined by the platforms may result in low accuracy in matching applications with the reference device.

Reference devices refer to models of electronic devices of manufacturers that implement only platform features, such as Google Nexus. A matching system can checked compatibility between applications and devices in such a way that the application developers check whether applications normally work on the reference device and the device manufacturers implement features defined in platforms and check whether the features run on the devices which are the same as the reference device.

Performing a matching process between electronic devices and applications based on compatibility verified on platforms, fail to consider 'device differentiated features' implemented by various manufacturers and 'manufacturer features.' As a result, the matching method might not perform precise matching between applications and devices. In particular, electronic devices implemented on the same platform may increase in type due to the Internet of Things (IoT), etc., and the variety of type of electronic devices to vary a combination of features, thereby seriously increasing the fragmentation of electronic devices. Precise, efficient determination as to whether devices are compatible with an application would be beneficial in order to support various types of devices via platforms; however, performing feature matching based on features of reference devices has limitations on the ability to determine compatibility.

For example, a first platform provider can includes features 'X', 'Y', and 'Z' in a first platform v1 and distribute it, and the device manufacturers implement the features of the platform by using hardware and software. Application developers develop applications by using the Software Development Kit (SDK) of the platform. As time goes by, the platform v1 technically evolves to platform v2, including feature 'T'. Device manufacturers are capable of developing electronic devices implemented on platform v2, Manufacturer-A (including features 'Y,' 'Z,' and 'T'). In the platform evolution, existing features (X, Y, and Z) may be altered, and the altered features are regarded as added features.

As device manufacturers compete with each other for the devices as platforms evolve, they are not differentiated from each other with only the electronic device implementing the same feature. Therefore, device manufacturers are capable of adding features for device differentiation (e.g., feature 'M') to electronic devices. For example, Manufacturer-B may implement feature "M." Although device differentiated features are not included in SDK distributed by platforms, it would be beneficial if device manufacturers had applications using added features to increase the usage of electronic devices. One way for manufacturers to do this is to distribute ad-hoc libraries for the use of corresponding features to application developers. One application developer (e.g., Developer-c) may develop applications including features 'T' and 'M.' The other application developer (e.g., Developer-a) may develop applications including features 'Y' and 'T.'

In this state, a content service provider that needs to match devices with applications and to show the application list to users may consider that an application developed by the Developer-c includes only feature 'M.' In this case, the content service provider may make a matching error whereby it determines that the application developed by the Developer-c is compatible with an electronic device, Manufacture-A (including features Y, Z, and T) as well as electronic device, Manufacture-B (including features M, Z, and T). When a matching process between applications and devices is performed by only features of open platforms, the probability of the matching-error occurring increases. In this case, content service providers are likely to provide applications that cannot be executed on the user's electronic devices.

SUMMARY

Various embodiments of the present invention provide a method and system that creates a device group having common features and efficiently matches features between applications and devices by using the device group.

Various embodiments provide a feature matching system comprising a communication unit configured to make communication with external devices; a controller configured to collect features via the communication unit, create device groups having common features between applications and electronic devices, determine a correlation between the features, and match the features between the applications and the electronic devices based at least in part on the device groups; and a database configured to store the collected features and the device groups.

Various embodiments provide a feature matching method of a feature matching system comprising: collecting features; creating device groups having common features between applications and electronic devices and determine a correlation between the features; matching features between the applications and the electronic devices by using the device groups; and writing features matching the applications with the electronic devices in a database.

BRIEF DESCRIPTION OF THE DRAWINGS

The features and advantages of the invention will become more apparent from the following detailed description in conjunction with the accompanying drawings, in which:

FIG. 5 illustrates a table for features by electronic devices according to various embodiments;

DETAILED DESCRIPTION

Figure 1:
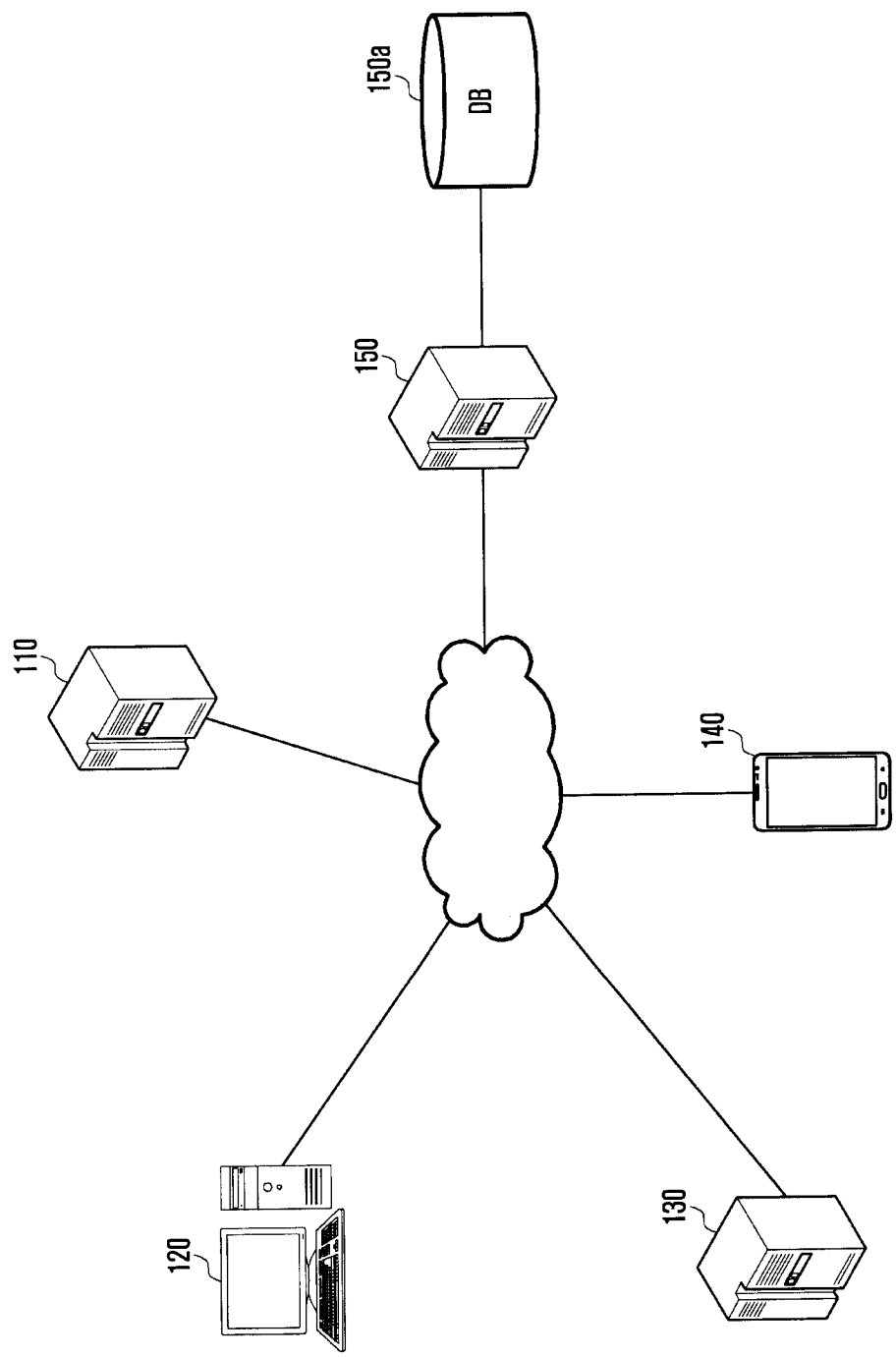
FIG. 1 illustrates a network environment for a system for matching features between applications and devices according to various embodiments.

Hereinafter, various embodiments are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

Electronic devices according to various embodiments of the present disclosure are used in the sense as concepts of devices including a communication function. For example, the electronic device is capable of including at least one of the following: a smartphone, Home Gateway, Home Automation, Building Automation, tablet personal computer (PC), mobile phone, video phone, e-book reader, desktop PC, laptop PC, netbook computer, workstation, server, personal digital assistant (PDA), portable multimedia player (PMP), MP3 player, mobile medical device, camera, wearable device (e.g., smart glasses, head-mounted-device (HMD), electronic clothes, electronic bracelet, electronic necklace, application accessory (appcessory), electronic tattoos, smart mirror, and smart watch.

According to some embodiments, an electronic device may be a smart home appliance that includes a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a home automation control panel, a security control panel, a TV box (e.g., Samsung HomeSync™, Apple TV™, Google TV™, etc.), a game console, an electronic dictionary, an electronic key, a camcorder, or an electronic picture frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, a Global Navigation Satellite System (GNSS), an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. The electronic device according to some embodiments of the present disclosure may be a flexible device. Further, the electronic device according to an embodiment of the present disclosure is not limited to the aforementioned devices, and may include a new electronic device according to the development of technology.

Some embodiments presented herein are capable of being called device-based (or terminal-based) matching methods. The device-based matching method includes features in addition to platform features. For example, to precisely match devices with applications, features of applications and all electronic devices to receive services can be subdivided, and a combination of subdivided features compatible with each other can be searched. Since device-based matching method objects receive services to features in addition to platform features of electronic devices, when the objects are matched with the features of electronic devices, the match precision is improved. However, when features of electronic devices are not limited to increase the precision, the more varied the features of electronic devices, the slower the electronic devices respond to the request, and thus the quality of service is lowered. Therefore, the certain embodiments presented herein increase the match precision and while reducing, or minimizing performance loss.

Hereinafter, the term 'feature(s)' may be defined as characteristics (features) shown to a user of a system or characteristics (features) that a user is capable of distinguishing. These features might not necessarily be shown, as external characteristics, to a user or may be characteristics that the user is capable of distinguishing empirically. Embodiments are capable of: storing platform features, manufacturer features, regional features, and device differentiated features in a database, distinguishing them from each other; reconfiguring them as a feature tree by using Frequent-Pattern Growth (FP Growth), considering the commonness of the features; and constructing a device group, based on a combination with the highest commonness, by using the feature tree. Embodiments are capable of matching features between applications and electronic devices by using the constructed device group and obtaining the precision of the feature matching process and the performance gain.

FIG. 1 illustrates a network environment for a network configured to match features between applications and devices according to various embodiments. The network can include, a platform provider 110, an application developer 120, device manufacturer 130, an electronic device 140, and a server for matching features between applications and devices 150 (hereinafter called a feature matching system).

The platform provider 110 may be an entity that develops and distributes platforms in an open platform environment. For example, the platform provider 110 may be an entity such as Google that provides the Android platform. The platform provider 110 is capable of adding features to platforms via various processes, such as adding new functions to platforms, correcting errors, etc. For example, platform provider 110 can includes features 'X', 'Y', and 'Z' in a first platform v1 and distribute it. As time goes by, the platform v1 technically evolves to platform v2, including feature 'T'. In the platform evolution, existing features (X, Y, and Z) may be altered, and the altered features are regarded as added features.

The application developer 120 may be an entity that develops applications running on an electronic device of a particular platform environment. When a new platform or a new electronic device is released, the application developer 120 is capable of modifying applications to meet the platform or electronic device or adding the applications to the platform or electronic device. That is, the application developer 120 modifies applications to include features to meet the new platform or electronic device or adds features to the applications. Application developer 120 may develop an application using the Software Development Kit (SDK).

The device manufacturer 130 may be an entity that produces and sells electronic devices described above. When a new platform is released, such as v2 described above, the device manufacture 130 is capable of modifying software or hardware of electronic devices to meet the new platform or adding software or hardware to the new platform. That is, the device manufacturer 130 is capable of including features, e.g., adding feature "T", in electronic devices to meet the new platform.

In addition, the device manufacturer 130 is capable of developing electronic devices including features that differ from each other, and from electronic devices developed from other manufacturers, even though the electronic devices uses the same platform, e.g., v2. The device manufacturer 130 may develop different electronic devices utilizing the same platform with different features according to various factors, such as geographic regions (e.g., countries) and price.

The electronic device 140 refers to devices with various platforms that various device manufacturers 130 developed according to geographic region or price. Therefore, the electronic device 140 is capable of including features that differ from each other according to versions of platform or device manufacturer 130, and product line from even the same manufacturer 130.

The feature matching system 150 connects the application developer 120 and the electronic device 140. The feature matching system 150 may be an entity for providing application market services (application market service provider). When the feature matching system 150 receives a request from the electronic device 140, it checks the compatibility between the electronic device 140 and applications to provide a list of applications capable of running on the electronic device 140. For example, the feature matching system 150 is capable of receiving device information from the electronic device 140. The device information contains information regarding features of the electronic device 140, e.g., information regarding software and hardware of the electronic device 140 and platform information (e.g., platform version) of the electronic device 140.

For example, when the electronic device 140 includes an acceleration sensor or a particularly type of GPS module, the feature matching system 150 is capable of providing the electronic device 140 with applications implemented by the acceleration sensor or GPS module. That is, when a particular application uses the GPS function of the particular type of GPS module in the electronic device, the feature matching system 150 is capable of providing the particular application to only electronic devices with the particular type of GPS module.

It should be understood that the feature matching system may also include various components other than the entities described above, such as electronic financial systems for processing money in the application transaction process, brokers for supplying a large amount of applications, etc.

However, since platforms are distributed with various versions, feature matching can be difficult for the platform provider 110 while maintaining the compatibility of later/earlier versions. In addition, the application developer 120 has difficulty checking whether applications that are being developed or have been developed work properly with given electronic devices. In particular, the user of the electronic device 140 may have difficulty in searching for applications compatible with the electronic device. When the application market service provider receives a request from the electronic device 140, it would be beneficial to provide application that are compatible with the electronic device 140; however, as the number of manufacturers and product lines increase, there is greater fragmentation of electronic devices 140. Accordingly, it is more difficult to determine the compatibility between a specific electronic device and applications.

In order to resolve the foregoing problems, the feature matching system 150 is capable of storing, in a database 150a, platform features of the platform provider 110, features included in applications of the application developer 120, manufacturer features of the device manufacturer 130, regional features of the electronic device 140, or device differentiated features. The feature matching system 150 is capable of constructing a device group representing common features between applications and electronic devices, determining the correlation between features stored in the database 150a, and matching features between applications and electronic devices by using the constructed device group, thereby increasing the precision of matching features.

Figure 2:
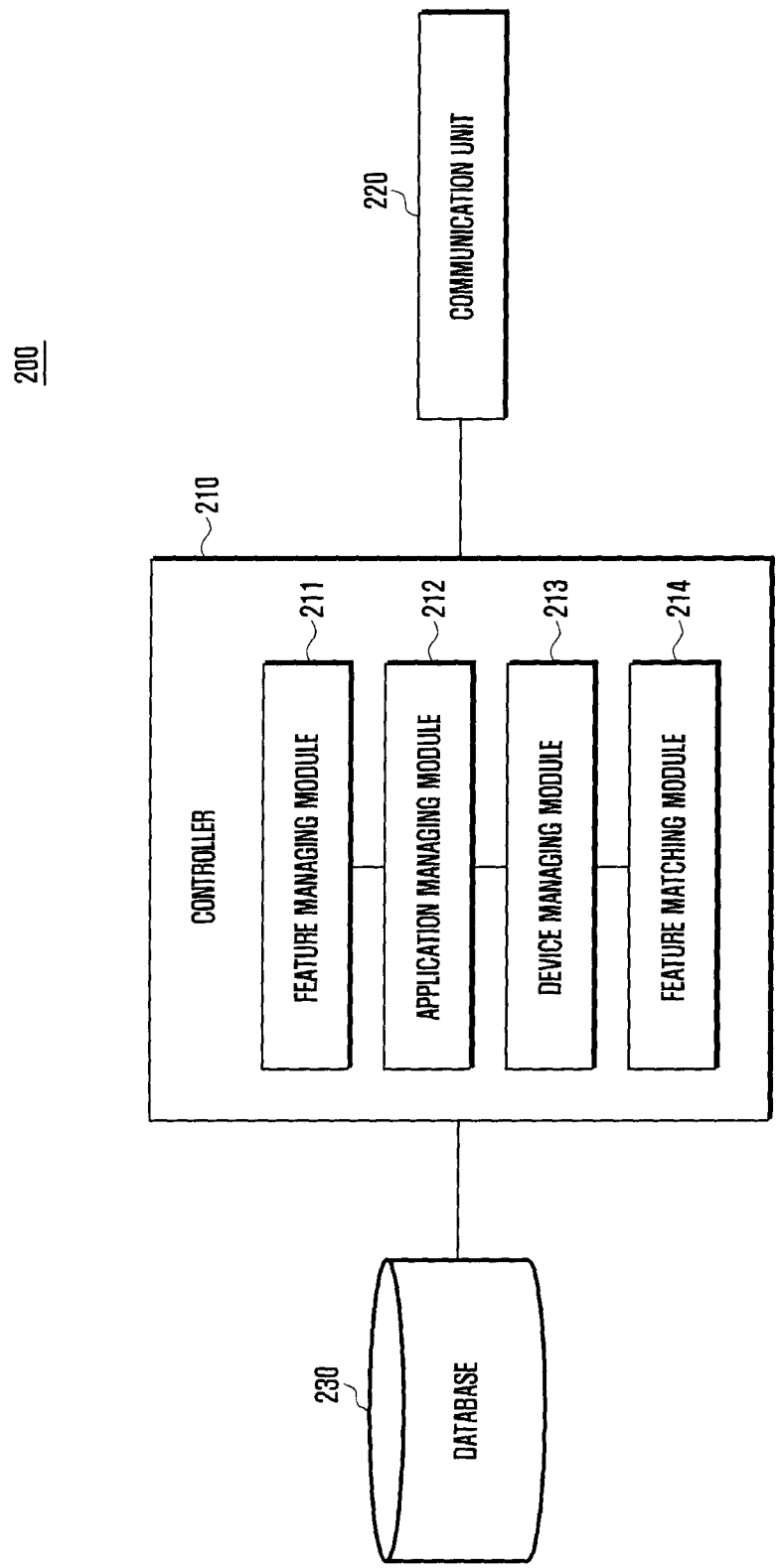
FIG. 2 illustrates a schematic block diagram of a feature matching system according to various embodiments.

FIG. 2 illustrates a schematic block diagram of a feature matching system according to various embodiments.

Referring to FIG. 2, the feature matching system 200 is capable of including a controller 210, a communication unit 220 and a database 230.

The controller 210 is capable of controlling all the operations of the feature matching system 200. The controller 210 is also capable of controlling signals flowing among the components and processing data in the feature matching system 200. The controller 210 is capable of including a feature managing module 211, an application managing module 212, a device managing module 213 and a feature matching module 214.

In certain embodiments of the present invention, the controller 210 can comprise one or more processors, and a memory storing executable instructions, operatively coupled to the one or more processors, such that the one or more processors is configured to execute the executable instructions. The term module can comprise memory storing executable instructions coupled to one or more processors such that the one or more processors are configured to execute the instructions. Multiple modules may use the same processor, or overlapping groups of one or more processors.

The feature managing module 211 collects features. When the feature managing module 211 receives a request for an application list from the electronic device 140 via the application managing module 212, it is configured to collect features of the electronic device 140. For example, to provide the requested application list to the electronic device 140, the feature managing module 211 is configured to request the device information from the electronic device 140. When receiving a request for an application list that the electronic device 140 made for the first time, or each time that the electronic device 140 makes a request for the application list, the feature managing module 211 is configured to request the device information from the electronic device 140. The device information contains information regarding features of the electronic device 140, e.g., information regarding software and hardware of the electronic device 140 and platform information (e.g., platform version) of the electronic device 140. The feature managing module 211 is configured to extract features of the electronic device 140 from the device information. The feature managing module 211 is configured to write the extracted features of the electronic device 140 in the database 230.

In addition, a service client, as an application through which the electronic device 140 accesses an application market service, may directly extract features of the electronic device 140 to transmit them to the feature managing module 211 via the communication unit 220. The communication unit 220 can comprises a communication interface configured to electronically communicate with external devices. For example, the communication unit 220 can comprise a transceiver for wirelessly transmitting and receiving data. Alternatively, the communication unit 220 can comprise a port for communication over the internet.

The feature managing module 211 may also extract features of the electronic device 140 by using description files containing device features. The description files are created as the device manufacturer 130 describes corresponding information, in a format set by an application market service provider, when producing electronic devices. An example of the description file is user agent profile (UAProf).

The feature managing module 211 is configured to classify features stored in the database 230. The feature managing module 211 is configured to classify the collected features, according to the characteristics, based on the commonness between particular ones of the collected features. The objective of the feature classification is to simplify the process of configuring a feature tree based on the correlation of features in the process of constructing a device group. The feature managing module 211 is configured to classify features into one of the following: a platform feature, a manufacturer feature, a regional feature, and a device differentiated feature.

The feature managing module 211 is configured to request features from the platform provider 110 via the communication unit 220, receiving the platform-related features from the platform provider 110, and storing the received features in the database 230. When a platform is updated or when a new platform is released, or periodically, the feature managing module 211 is capable of requesting the features from the platform provider 110. When the feature managing module 211 receives an update platform or a new platform from the platform provider 110, it may also extract features from the received platform. The feature managing module 211 is configured to request features from the application developer 120 via the communication module 220, receive features related to applications from the application developer 120, and write the received features in the database 230. When applications are updated, when new applications are added, or periodically, the feature managing module 211 is configured to request the features from the application developer 120. When the feature managing module 211 receives updated applications or new applications from the application developer 120, it may also extract the features from the received applications.

The feature managing module 211 is configured to request features from the device manufacturer 130 via the communication module 220, receive features related to electronic devices from the device manufacturer 130, and write the received features in the database 230. When electronic devices are updated, when new electronic devices are released, or periodically, the feature managing module 211 is configured to request the features from the device manufacturer 130. When the feature managing module 211 receives device information regarding updated electronic devices or new electronic devices from the device manufacturer 130, it may also extract the features from the received device information.

The application managing module 212 is configured to register applications from the application developer 120 via the communication unit 220. The application managing module 212 is configured to store the registered applications in the database 230. When an application is modified, the application managing module 212 is configured to change the application stored in the database 230 to the modified application. When new applications are released, the application managing module 212 is configured to register the new applications and write them in the database 230. When an application is modified or a request is made to register a new application, the application managing module 212 is configured to notify the feature managing module 211 of the modification or registration of the application, so that the feature managing module 211 can extract features from the application.

The application managing module 212 is configured to set the items (e.g., region (or country), electronic device, etc.) to which the applications will be distributed in the process of registering applications. The application managing module 212 is also configured to perform a test to check the service propriety of the application, e.g., a compatibility test, a basic operation test, a risk test, etc. The application managing module 212 receives a request for an application list from the electronic device 140 via the communication unit 220. The application managing module 212 is capable of searching the database 230 for the application matched with the device information regarding the electronic device 140 that requested the application list. The database 230 is configured to store features according to electronic devices and a list of applications corresponding to the features. The application managing module 212 is configured to search for an application list corresponding to features of the electronic device 140 from the database 230 and provide the searched application list to the electronic device 140.

When device information regarding the electronic device 140 that requested an application list is not searched for from the database 230, the application managing module 212 is configured to transmit the device information to the feature managing module 211 in order to find out the features contained in the device information. When the feature managing module 211 extracts a feature of the device information and stores the feature in the database 230, the feature matching module 214 is configured to detect an application matching the extracted feature. After that, the application managing module 212 is configured to search the database 230 for an application matching the device information regarding the electronic device 140.

The device managing module 213 is configured to register the information regarding electronic devices (device information) from the device manufacturer 130 or the electronic device 140 via the communication unit 220. The device managing module 213 is configured to store the registered device information in the database 230. When electronic devices are upgraded, the device managing module 213 is configured to change the device information, written in the database 230, to the upgraded device information. When a new electronic device is released, the device managing module 213 is configured to register the device information regarding the new electronic device 140 and write the device information in the database 230. When the device managing module 213 ascertains that an electronic device is upgraded or registers device information regarding a new electronic device, it is configured to notify the feature managing module 211 of the modification or registration of the electronic device, so that the feature managing module 211 can extract features contained in the device information regarding the electronic device.

The feature matching module 214 constructs device groups representing common features between applications and electronic devices, considering the correlation between features, and configures a feature tree by using the constructed device groups, thereby matching features between the applications and electronic devices, based on the feature tree. The device groups refer to sets of devices (terminals) into which various devices (terminals) are classified based on a particular reference. The feature matching module 214 is configured to classify device groups based on features and analyze the classified features to create logical device groups, i.e., device groups. That is, the device group is a set of features and also a set of devices, newly defined by analyzing a list of features collected from the respective electronic devices. The feature matching module 214 is configured to analyze the classified features via Frequent-Pattern Growth (FP Growth).

The feature matching module 214 is configured to derive frequencies of appearance of the respective features classified in the feature table, and arranging the features in descending order, based on the derived frequencies of appearance. The feature matching module 214 is configured to set a list of features by electronic devices to an item set, referring to the arranged features. That is, one or more features included in one electronic device are formed as a feature list, and the feature list is set to one item set. The feature matching module 214 is configured to set up a support factor to the set item set, and create a feature tree that sets one feature as one node based on the support factor. The feature matching module 214 is configured to traverse the configured feature tree and analyze the association rule between nodes, thereby modifying the feature tree. For example, when two features need to be associated with each other, the feature matching module 214 is capable of judging the two features to be associated with each other, concatenating two nodes into one node, and modifying the feature tree based on the concatenation result. The feature matching module 214 is configured to allocate branch nodes to a device group in the modified feature tree, except for a leaf node. The feature matching module 214 is capable of storing a list of features included in one device group, as a feature matching table, in the database 230. The feature matching module 214 is configured to notify the electronic device 140 of the device group allocated to the electronic device 140 via the communication unit 220.

The communication unit 220 is configured to perform data communication with external devices via networks, such as a mobile communication network or LTE, wired or wireless LAN, etc., under the control of the controller 210. Examples of the external devices are a platform provider 110, an application developer 120, a device manufacturer 130, and an electronic device 140 (feature matching system 150).

The database 230 is capable of storing feature tables including features according to electronic devices. For example, the database 230 is configured to store feature tables that include features of electronic devices, based on platform features, manufacturer features, regional features, according to platforms, and inherent device features. The database 230 is configured to store a list of features, included in a device group, in a feature matching table. The database 230 is configured to update the feature matching table according to the control of the controller 210. The database 230 is also configured to store device information according to electronic devices and applications.

Figure 3:
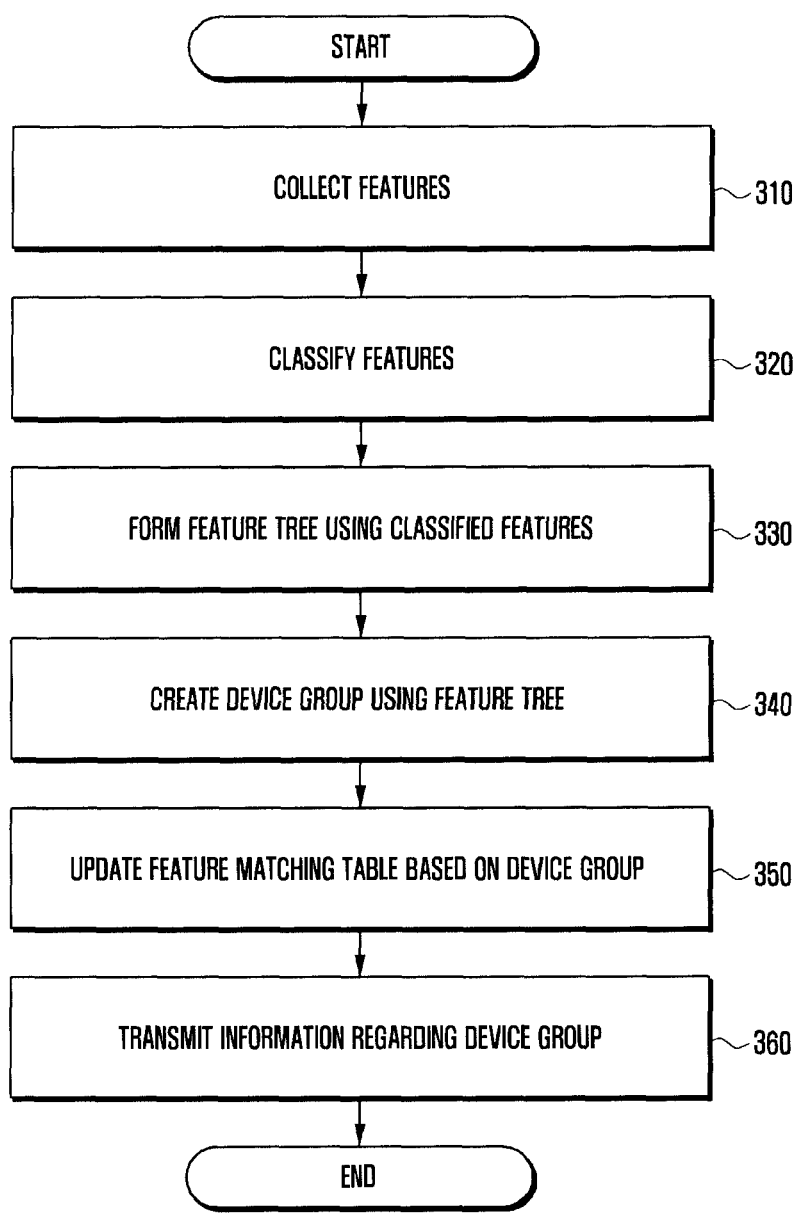
FIG. 3 illustrates a flow diagram showing a method of matching features between applications and devices according to various embodiments.

FIG. 3 illustrates a flow diagram showing a method of matching features between applications and devices according to various embodiments.

Referring to FIGS. 2 and 3, the controller 210 collects features in operation 310. When receiving a request for an application list from the electronic device 140, the feature managing module 211 of the controller 210 is configured to request the device information from the electronic device 140. When receiving a request for an application list that the electronic device 140 made for the first time, or each time that the electronic device 140 makes a request for the application list, the feature managing module 211 is configured to request the device information from the electronic device 140. The device information contains information regarding features of the electronic device 140, e.g., information regarding software and hardware of the electronic device 140 and platform information (e.g., platform version) of the electronic device 140. The feature managing module 211 is configured to extract features of the electronic device 140 from the device information. In addition, a service client inside the electronic device 140 may directly extract features of the electronic device 140 to transmit them to the feature managing module 211 via the communication unit 220. The feature managing module 211 is configure to write the extracted features of the electronic device 140 in the database 230.

The feature managing module 211 is configured to classify features stored in the database 230 in operation 320. The feature managing module 211 is configured to classify the stored features into one of the following: a platform feature, a manufacturer feature, a regional feature, and a device differentiated feature.

The platform feature refers to features distributed by the platform provider 110. The platform feature also means features that all the electronic devices, developed on the basis of the platform, are capable of having in common. The platform feature may be features used for the traditional platform-based application-device matching (e.g., operating system version, display resolution, etc.). The manufacturer feature refers to features (e.g., Samsung Touch-wiz Home, Group play, LG Home, etc.) included in a product group of a corresponding manufacturer so that the manufacturer differentiates the products from a competing manufacturer.

The regional feature refers to features used for only particular countries or features for a particular network operator environment, reflecting characteristics of a mobile environment. Examples of the regional feature are Cheon Ji In in Korea, LTE-A, etc. The device differentiated feature refers to features for inherent characteristics for a particular device group, e.g., IrDa, S-pen, heart-rate sensor, waterproof qualities, fingerprint recognizer, etc. Although electronic devices have been developed by the same device manufacturer, the device differentiated feature allows the electronic devices to be classified into product groups, thereby achieving price differentiation, consumer differentiation, etc. In this case, the platform feature forms mandatory features, and the other features may be classified as optional features.

The feature matching module 214 of the controller 210 configures a feature tree by using the classified features in operation 330. The feature matching module 214 is configured to arrange features in descending order, based on frequencies of appearance of the respective features as classified in the feature table. The feature matching module 214 is configured to set a list of features by electronic devices to an item set, refer to the arranged features. The feature matching module 214 is configured to set up a support factor to the set item set, and create a feature tree that sets one feature as one node based on the support factor. The configuration of a feature tree will be described in detail later referring to FIG. 6.

The feature matching module 214 is configured to create a device group by using the feature tree in operation 340. The feature matching module 214 is configured to analyze the association rule between features based on the feature tree to modify the feature tree. The feature matching module 214 is configured to allocate branch nodes to a device group in the modified feature tree, except for a leaf node.

The feature matching module 214 is configured to update the feature matching table based on the device group in operation 350. The feature matching table refers to a table that shows features matching between applications and electronic devices so that the user can recognize it at a glance. For example, the feature matching table may include information about matched device groups by applications. The feature matching table may have been stored in the database 230. The feature matching module 214 is configured to update the existing feature matching table according to the occurrence of an event, e.g., an update of a platform or an addition of a new platform, an update of an application or an addition of a new application, an upgrade of an electronic device or an addition of a new electronic device, etc.

The communication unit 220 is configured to transmit, to the electronic device 140, information regarding a device group corresponding to the electronic device 140 in operation 360. Transmission of information regarding a device group to the electronic device 140 is performed to allow the electronic device 140 to transmit a request for an application list to the feature matching system 200, along with the information regarding a device group. When the electronic device 140 requests an application list from the feature matching system 200, it may transmit information regarding a device group along with the request. In this case, the feature matching system 200 more precisely, rapidly searches for applications executable on the electronic device 140 by using the information regarding a device group, and provides the searched applications to the electronic device 140.

Figure 4:
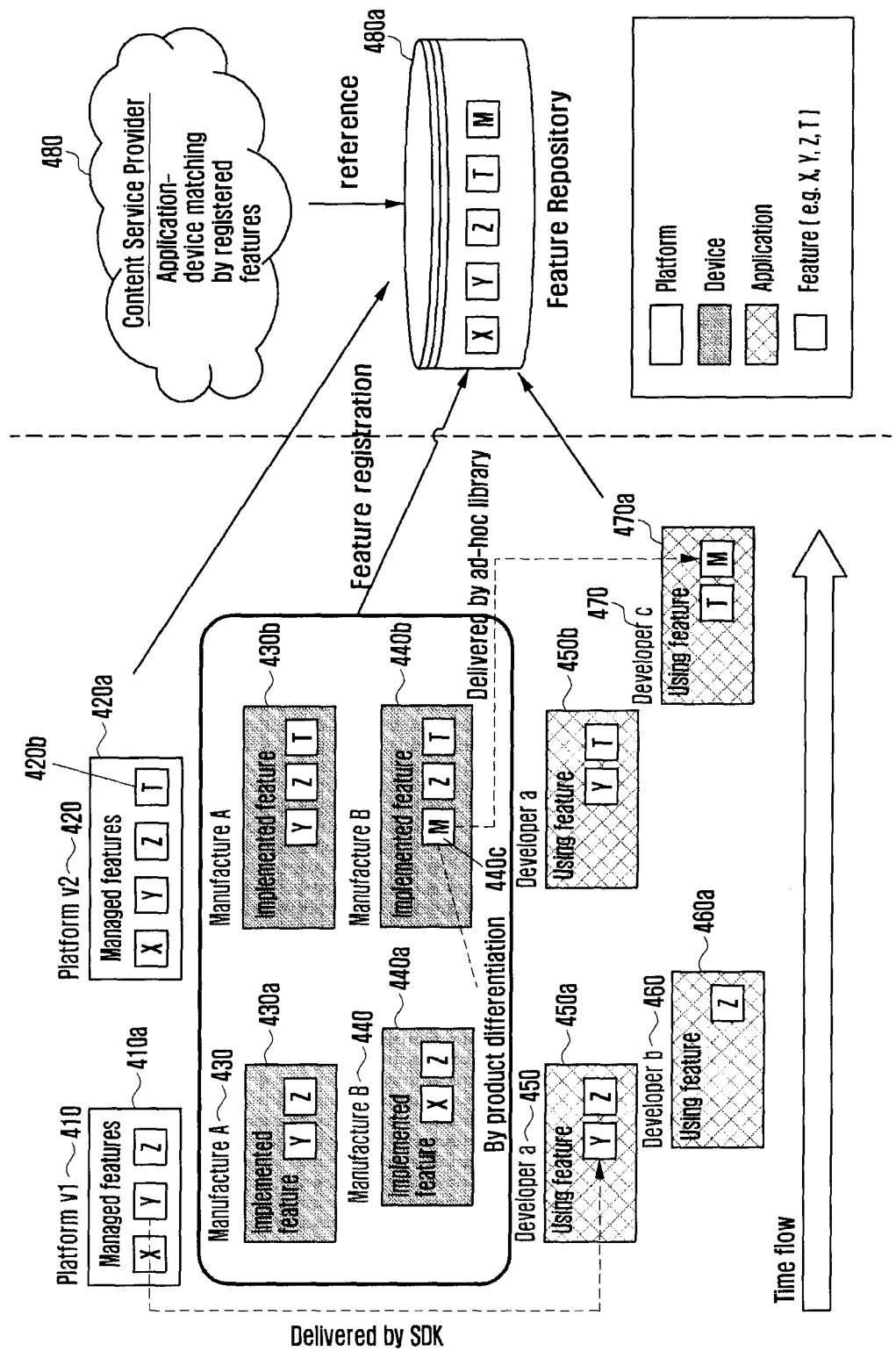
FIG. 4 illustrates a diagram that describes processes of collecting features and storing the features in a feature repository according to various embodiments.

FIG. 4 illustrates a diagram that describes processes of collecting features and storing the features in a feature repository according to various embodiments.

Referring to FIG. 4, the platform provider 110 is configured to distribute the first platform, Platform v1, 410, including features 'X', 'Y', 'Z' 410a. The platform provider 110 is configured to notify content service provider 480 that Platform v1 410 is released or notify content service provider 480 (e.g., feature matching system 200) of features included in Platform v1 410. The content service provider 480 is also configured to extract features included in Platform v1 410 and to write the features in a feature repository 480a (e.g., database 230).

Manufacturers A and B, 430 and 440 respectively, are develop electronic devices with hardware and software, based on a feature 410a of Platform v1 410. The first Manufacturer A 430 develops an electronic device 430a including features Y and Z of Platform v1 410. The second Manufacturer B 440 develops an electronic device 440a including features X and Z of Platform v1 410. The Manufacturers A and B notifying the content service provider 480 that electronic devices 430a and 440a are released or notify the content service provider 480 of features included in the electronic devices 430a and 440a. The content service provider 480 is also configured to extract features included in the electronic devices 430a and 440a and store the features in a feature repository 480a.

Application developers a and b, 450 and 460 respectively, develop applications by using Software Development Kit (SDK) of Platform v1 410. For example, the first application developer 450 develops an application 450a by using features Y and Z of Platform v1 410. The second application developer 460 develops an application 460a by using a feature Z of Platform v1 410. The application developers a and b, 450 and 460 respectively, notify the content service provider 480 that applications 450a and 460a are released or notify the content service provider 480 of features included in the applications 450a and 460a. The content service provider 480 is also capable of extracting features included in the applications 450a and 460a and writing the features in a feature repository 480a.

As time goes by, Platform v1 410 technically evolves into Platform v2 420, including feature 'T'. In the platform evolution, existing features (X, Y, and Z) may be altered, and the altered features are regarded as added features. That is, Platform v2 420 is capable of including features X, Y, and Z and a new feature 'T.' The platform provider 110 notifies the content service provider 480 that Platform v2 420 is released or notifies the content service provider 480 of features included in the Platform v1 420. The content service provider 480 is also configured to extract features included in Platform v1 420 to write the features in the feature repository 480a.

Manufacturers A and B, 430 and 440 respectively, are capable of developing electronic devices with hardware and software, based on a feature 420a of Platform v2 420. The first Manufacturer A 430 is capable of developing an electronic device 430b including features Y, Z and T of Platform v2 420. The second Manufacturer B 440 develop an electronic device 440b including features Z and T of Platform v2 420. Where device manufacturers seriously compete with each other, the manufacturers may seek to differentiate themselves from each other by implementing different features. Therefore, the second Manufacturer B 440 may add feature M to the electronic device 440b to differentiate themselves from Manufacturer A. Although a feature is not included in the SDK distributed by platforms, an application can be developed that takes advantage of feature M of the second Manufacturer 440. Therefore, the second Manufacture 440 distributes an ad-hoc library using the feature M to the application developers 450.

The Manufacturers A and B 430 and 440 respectively, are notify the content service provider 480 that electronic devices 430b and 440b are released or notify the content service provider 480 of features included in the electronic devices 430b and 440b, e.g., 'Y', 'Z', 'T', and 'M', 'Z', 'T', respectively. The content service provider 480 extracts features included in the electronic devices 430b and 440b and write the features in a feature repository 480a.

Application developers a, b, and c, 450, 460 and 470 respectively, are capable of developing applications by using the SDK of Platform v2 420. That is, the first application developer 450 (Developer a) can develop an application 450b including features Y and T. The third application developer 470 (Developer c) can develop an application 470a including features T and M. The application developers 450 and 470 are capable of notifying the content service provider 480 that applications 450b and 470a are developed or notify the content service provider 480 of features included in the applications 450b and 470a. The content service provider 480 is configured to extract features included in the applications 450b and 470a and write the features in a feature repository 480a.

Since the feature repository 480a stores features included in the electronic devices 430a to 440b and features included in applications 450a to 470a, the content service provider 480 is capable of precisely searching for applications matching electronic devices 430a to 440b. Therefore, the content service provider 480 reduces the error of matching between applications and electronic devices and thus decreases the possibility to provide applications that cannot be executed on electronic devices.

For example, when the content service provider 480 as an application market service server receives a request for an application list from electronic devices 430a to 440b, it is configured to rapidly provide the application list to the electronic devices, referring to the feature repository 480a. The content service provider 480 is configured to include application 470a in the application list and provide the application list to the electronic device 440b including feature M from among the electronic devices 430a to 440b connected to the application market service. The feature repository 480a is configured to include a feature table including features and a feature matching table including features matching between applications and electronic devices.

The feature repository 480a is configured to include a feature table shown in FIG. 5.

FIG. 5 illustrates a table for features by electronic devices according to various embodiments.

Referring to FIG. 5, the feature table is includes features (510, 520, 530 and 540) classified according to electronic devices 560, 570, and 580. The platform feature 510 refers to features that are distributed by a platform provider 110 and commonly included in all the electronic devices that are developed on the basis of platforms. The manufacturer feature 520 refers to features that the device manufacturer 130 included in the product group to differentiate the products from a competing manufacturer. The regional feature 530 refers to features used for only particular countries or features for a particular network operator environment, reflecting characteristics of a mobile environment. The device differentiated feature 540 refers to features having a unique characteristic for a particular device group. That is, although electronic devices have been developed by the same device manufacturer, the device differentiated feature allows the electronic devices to be classified into product groups, thereby achieving price differentiation, consumer differentiation, etc. Therefore, referring to the feature table of FIG. 5, the electronic devices include different features and thus differ from each other.

Figure 6:
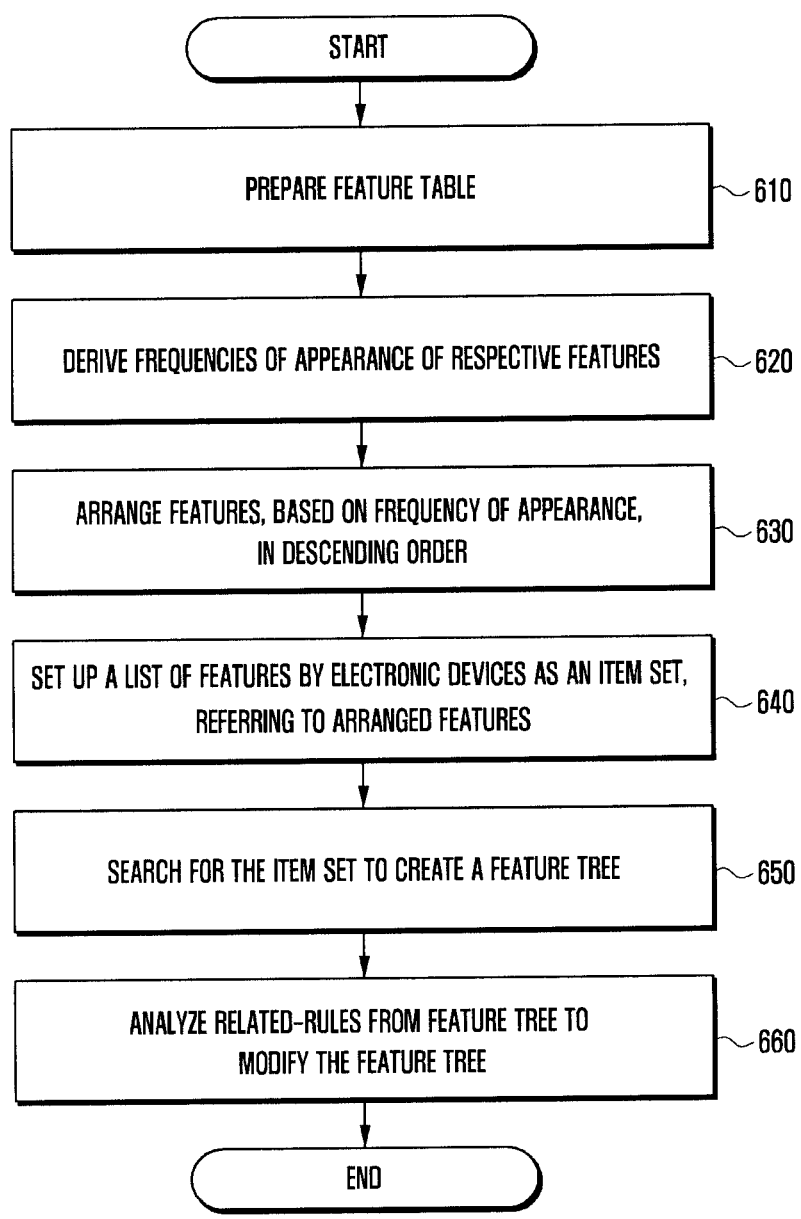
FIG. 6 illustrates a flow diagram showing a method of creating a feature tree according to various embodiments.

FIG. 6 illustrates a flow diagram showing a method of creating a feature tree according to various embodiments.

Referring to FIGS. 2 and 6, the feature managing module 211 of the controller 210 prepares a feature table in operation 610.

TABLE 1

| Device Name | Features | | | | | | | |
|---|---|---|---|---|---|---|---|---|
| | Platform features | | Manufacturer features | | Regiional features | | Differentiated features | |
| | PF1 | PF2 | MF1 | MF2 | RG1 | RG2 | DF1 | DF2 |
| D1 | ○ | ○ | ○ | X | ○ | ○ | X | X |
| D2 | ○ | ○ | ○ | X | ○ | ○ | ○ | X |
| D3 | ○ | ○ | X | X | ○ | X | X | X |
| D4 | ○ | ○ | X | X | ○ | X | X | X |
| D5 | ○ | ○ | X | ○ | ○ | ○ | X | ○ |
| D6 | ○ | X | X | ○ | X | ○ | X | X |

\* Constraint: DV1 requires MF1 && DV2 requires MF2

In table 1, D1 to D5 denote the name of electronic devices and PF1 to DF2 denote the name of classified features. Operations 310 and 320 use the feature table to collect features from electronic devices; and the collected features are classified. Although the feature table is as shown in FIG. 5, for convenience in description, the feature table is described, based on table 1.

The feature matching module 214 of the controller 210 is can derive frequencies of appearance of the respective features classified in the feature table in operation 620. That is, the feature matching module 214 is capable of calculating number of appearances of the respective features PF1, PF2, MF1, MF2, RG1, RG2, DF1, and DF2.

The feature matching module 214 arranges the features in descending order, based on the derived frequencies of appearance, in operation 630.

TABLE 2

| Features | Count | | Sorted item | Count |
|---|---|---|---|---|
| PF1 | 6 | | PF1 | 6 |
| PF2 | 5 | | RG1 | 5 |
| MF1 | 2 | | PF2 | 5 |
| MF2 | 2 | ⇒ | RG2 | 4 |
| RG1 | 5 | | MF1 | 2 |
| RG2 | 4 | | MF2 | 2 |
| DF1 | 1 | | DF1 | 1 |
| DF2 | 1 | | DF2 | 1 |

The left table of the table 2 shows the frequency of appearance (e.g., count) for respective features. The right table of the table 2 arranges the features in descending order, based on the frequency of appearance.

The feature matching module 214 is sets a list of features according to electronic devices to an item set, referring to the arranged features, in operation 640.

TABLE 3

| item set | Count |
|---|---|
| {PF1, RG1, PF2, RG2, MF1} | 1 |
| {PF1, RG1, PF2, RG2, MF1, DF1} | 1 |
| {PF1, RG1, PF2} | 2 |
| {PF1, RG1, PF2, RG2, MF2, DF2} | 1 |
| {PF1, RG2, MF2} | 1 |

As described in table 3, features included in one electronic device may be set as one item set, referring to the right table of the table 2 where the features are arranged in descending order. The feature matching module 214 is capable of calculating the count (frequency) of item sets. That is, referring to table 3, the feature matching module 214 calculates the count of the item set including features PF1, RG1, and PF2 as two, and the count for the remaining item sets as one.

In operation 650, the feature matching module 214 traverses the item sets to create a feature tree. The feature matching module 214 sets up the minimum support factor based on the count of item sets. Referring to table 3, since the amount of data for creating a feature tree is small enough that any item set to be omitted does not exist, the feature matching module 214 may set the minimum support factor to one. The feature matching module 214 is capable of creating a feature tree according to the minimum support factor as shown in FIG. 7A.

Figure 7A:
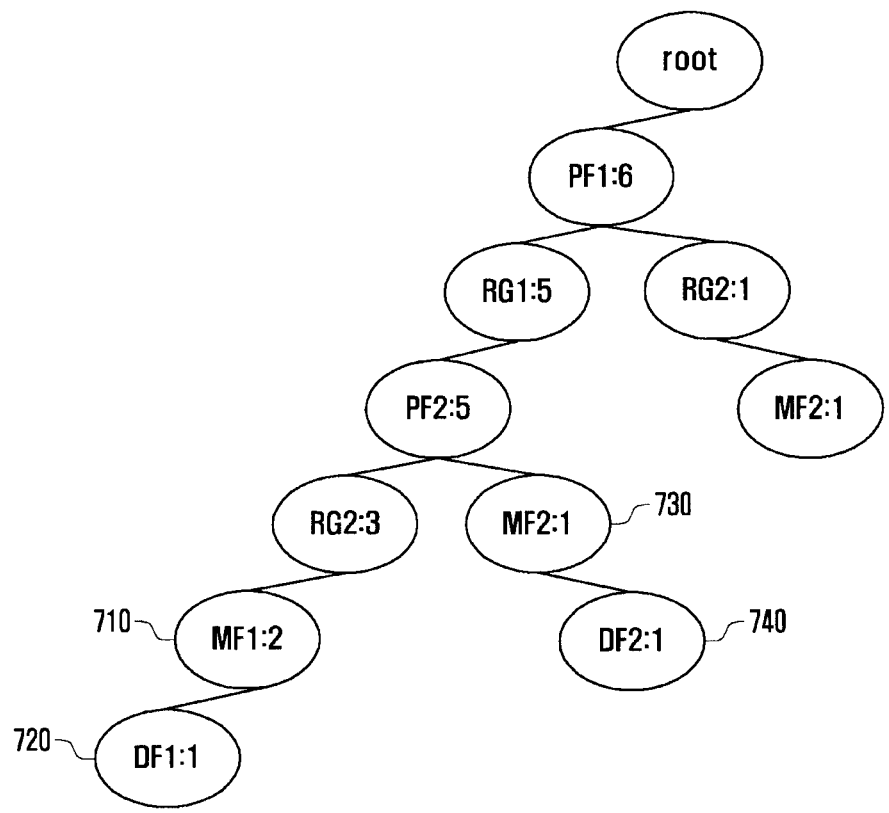
FIG. 7A and FIG. 7B illustrate feature trees according to various embodiments.
Figure 7B:
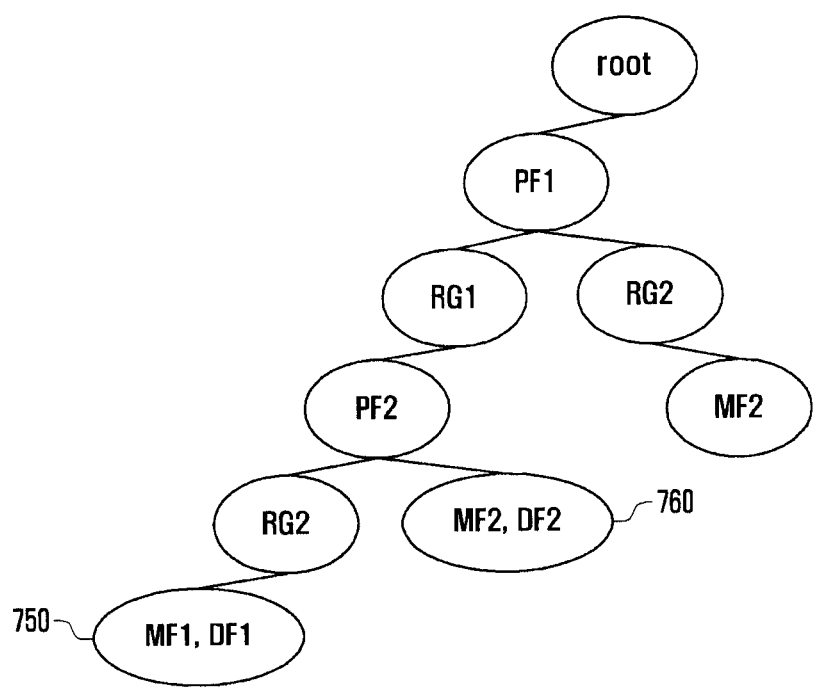

Certain embodiments can comprise a non-transitory computer-readable medium storing data organized as illustrated in FIGS. 7A and 7B or a non-transitory computer-readable medium storing instructions that, when executed cause storage of data organized as illustrated in FIGS. 7A and 7B. Moreover, it shall be understood that in FIGS. 7A and 7B, references to roots, nodes, branch nodes, trees, and tables describe relationships between memory locations, for example, memory locations in the database, storing identifications of the indicated features.

FIGS. 7A and 7B illustrate feature trees according to various embodiments.

Referring to FIG. 7A, the feature matching module 214 is configured to assign nodes starting from the original node root to features, respectively, one by one. For example, when one node (node 1) needs to be associated with another node (node 2), the feature matching module 214 is configured to connect node 2 to the branch node of node 1. When feature MF2 needs features PF1 and RG2, the feature RG2 is connected to the branch node of the feature PF1 and the MF2 is connected to the branch node of the RG2.

According to various embodiments, the feature matching module 214 is creates feature trees by using the Frequent-Pattern Growth (FP Growth) in operations 610 to 650.

Referring back to FIG. 6, the feature matching module 214 analyzes the association rule from the feature tree to modify the feature tree in operation 660. That is, when two features need to be associated with each other, the feature matching module 214 compares the two features to be associated with each other and then concatenates two nodes into one node. For example, referring to FIG. 7A, feature DF1 720 needs feature MF1 710, and feature DF2 740 needs feature MF2 730.

Based on the association rule described above, as shown in FIG. 7B, the feature matching module 214 is configured to concatenate features MF1 an DF1 750 into one node and features MF2 and DF2 760 into one node, thereby modifying the feature tree.

The modified feature tree has nine nodes and six electronic devices are configured with six features. Since the number of nodes is greater than that of the electronic devices, the complexity appears to increase. This is, however, because the number of electronic devices is set to be very small. The more the number of types of electronic devices increases and the more the number of features commonly included in the respective electronic devices increases, the more the number of nodes decreases compared with the number of types of electronic devices, the more the usefulness increases.

The feature matching module 214 is configured to allocate device groups to nodes of the feature tree shown in FIG. 7B, respectively. For example, the feature matching module 214 is configure to allocate: device group LDG1 to feature PF1; LDG1-1 to PF1 and RG1; LDG1-1-1 to PF1, RG1, and PF2; LDG1-1-1-1 to PF1, RG1, PF2, and RG2; and LDG1-1-1-1-1 to PF1, RG1, PF2, RG2, MF2, and DF2. As such, as device groups according to nodes of the feature tree are allocated to features, the device group table showing electronic devices and features according to device groups is obtained as in the following table 4.

TABLE 4

| Device group name | Contained features | Dedicated devices |
|---|---|---|
| LDG1 | PF1 | None |
| LDG1-1 | PF1, RG1 | None |
| LDG1-1-1 | PF1, RG1, PF2 | D3, D4 |
| LDG1-1-1-1 | PF1, RG1, PF2, RG2 | None |
| LDG1-1-1-1-1 | PF1, RG1, PF2, RG2, MF2, DF2 | D5 |
| LDG1-1-1-1-2 | PF1, RG1, PF2, RG2, MF1, DF1 | D1, D2 |
| LDG1-2 | PF1, RG2 | None |
| LDG1-2-1 | PF1, RG2, MF2 | D6 |

Table 4 shows the relationship of contained features between device group names. Since features requested by applications are part of the features of an electronic device, the feature matching module 214 is configured to determine the relationship of contained features between device group names, based on a name of a device group, referring to table 4. In order to match an application with an electronic device, the feature matching module 214 is configured to search for a device group containing features required by the application.

TABLE 5

| Application name | Required features |
|---|---|
| App1 | PF1, PF2 |
| App2 | PF1 |
| App3 | PF1, RG1 |
| App4 | PF1, PF2, MF1, DF1 |
| App5 | PF1, PF2, RG1, MF2, DF2 |
| App6 | PF2, RG2 |

Table 5 shows application (e.g., application name) and required features contained in the application.

The feature matching module 214 is configured to create a feature matching table matching features between applications and electronic devices, referring to tables 4 and 5.

TABLE 6

| Application name | Matched device group |
|---|---|
| App1 | LDG1-1-1 |
| App2 | LDG1 |
| App3 | LDG1-1 |
| App4 | LDG1-1-1-1-2 |
| App5 | LDG1-1-1-1-1 |
| App6 | LDG1-1-1 |

In table 6, the feature matching table includes a field of application (e.g., application name) and a field of matched device group. The feature matching module 214 is capable of searching table 4 for a device group containing features included in each of the applications to obtain the feature matching table shown in table 6. Although a number of device groups with the appropriateness according to applications may be obtained from tables 4 and 5 (e.g., App1 may have device groups LDG1-1-1, LDG1-1-1-1, LDG1-1-1-1-1, and LDG1-1-1-1-2), only the device group LDG1-1-1 is shown. This is because LDG1LDG1-1-1 is the device group with the least feature condition required by the application. Since the other device groups contain all the features of LDG1-1-1, they do not need to be described in the feature matching table.

As described above, compared with a method of listing individual features, various embodiments are capable of saving the storage space of the feature matching table and omitting, when an electronic device requests an application list, a process of combining features, thereby reducing the response time to the request.

As described above, various embodiments of the present invention are capable of creating a device group having common features, thereby efficiently matching features between applications and devices by using the device group.

Various embodiments are capable of managing features, which differ from each other according to platforms, manufacturers, regions, electronic devices, etc., in a common storage unit, and thus efficiently managing the features.

Various embodiments are capable of increasing the precision of matching features between applications and devices and minimizing the performance loss.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

What is claimed is:

1. A matching server for matching features between an application and an electronic device comprising:
   a communication unit;
   a database; and
   a processor configured to:
   collect various types of features using the communication unit and store the collected features in the database, wherein the various types of features include a platform feature, a manufacturer feature, a regional feature, and a device differentiated feature,
   classify the features based on commonness between the features,
   configure a feature tree arranging features based on frequencies of appearance of the respective features by using the classified features,
   create device groups having common features by using the feature tree,
   update a feature matching table including features matching between applications and electronic devices based on the device groups, and
   transmit, to the electronic device, information regarding a device group corresponding to the electronic device.

2. The matching server of claim 1, wherein the processor comprises:
   a feature managing module configured to collect, when receiving a request for an application list from an electronic device, features associated with the electronic device, from the electronic device.

3. The matching server of claim 1, wherein the processor: requests, when receiving a request for an application list from an electronic device, device information from the electronic device; and extracts, when receiving the device information from the electronic device, features associated with the electronic device from the device information.

4. The matching server of claim 1, wherein the processor comprises:
   a feature matching module configure to write the feature tree in the database by using Frequent-Pattern Growth (FPG) and create a device group by using the feature tree stored in the database.

5. The matching server of claim 1, wherein the processor comprises:
   a feature matching module for deriving frequencies of appearance of the features stored in the database and writing the feature tree stored in the database based on the derived frequencies of appearance, wherein a higher node is allocated to a feature with a highest frequency of appearance.

6. The matching server of claim 5, wherein the feature matching module traverses the feature tree in the database to analyze an association rule between nodes and concatenates one or more nodes associated with each other via the association rule into one node to modify the feature tree stored in the database.

7. The matching server of claim 6, wherein the feature matching module allocates branch nodes, except for a leaf node in the modified feature tree, to a device group.

8. The matching server of claim 1, wherein the processor further comprises:
   an application managing module for storing a requested application in the database in response to receiving an application registration request from an application developer.

9. The matching server of claim 8, wherein the processor is configured to:
   search for a device group containing features included in the application,
   match the application with the searched device group, and store a matched result in the database.

10. A matching method of a matching server comprising:
   collecting, by a processor, various type of features using a communication unit and storing the collected features in a database, wherein the various types of features include a platform feature, a manufacturer feature, a regional feature, and a device differentiated feature;
   classifying the features based on commonness between the features;
   configuring a feature tree arranged features based on frequencies of appearance of the respective features by using the classified features;
   creating device groups having common features by using the feature tree;
   updating a feature matching table including features matching between applications and electronic devices based on the device groups, and
   transmitting, to the electronic device, information regarding a device group corresponding to the electronic device.

11. The method of claim 10, wherein collecting features comprises:
   when receiving a request for an application list from an electronic device, collecting features associated with the electronic device, from the electronic device.

12. The method of claim 10, wherein collecting features further comprises:
   when receiving a request for an application list from an electronic device, requesting device information from the electronic device; and
   when receiving the device information from the electronic device, extracting features associated with the electronic device from the device information.

13. The method of claim 10, wherein creating device groups comprises:
   writing the feature tree in the database by using Frequent-Pattern Growth (FPG); and
   creating a device group by using the feature tree.

14. The method of claim 10, wherein creating device groups comprises:
   deriving frequencies of appearance of the features stored in the database; and
   writing the feature tree based on the derived frequencies of appearance wherein a higher node is allocated to a feature with a highest frequency of appearance.

15. The method of claim 14 wherein creating the feature tree comprises:
   analyzing an association rule between nodes by traversing the feature tree; and
   modifying the feature tree by concatenating one or more nodes associated with each other via the association rule into one node.

16. The method of claim 15 wherein creating device groups comprises:
   allocating branch nodes, except for a leaf node in the modified feature tree, to a device group.

17. The method of claim 10, further comprising:
   receiving an application registration request from an application developer; and
   storing the requested application in the database.

18. The method of claim 17 wherein matching features between the applications and the electronic devices comprises:
   searching for a device group containing features included in the application; and
   matching the application with the searched device group and storing a matched result in the database.

* * * * *